(12) United States Patent
Saito et al.

(10) Patent No.: US 6,289,036 B1
(45) Date of Patent: Sep. 11, 2001

(54) SPREAD SPECTRUM COMMUNICATION APPARATUS AND METHOD

(75) Inventors: Katsuo Saito, Yokohama; Atsushi Takasaki, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/801,364

(22) Filed: Feb. 19, 1997

(30) Foreign Application Priority Data

Feb. 26, 1996 (JP) .................................................. 8-037947

(51) Int. Cl.[7] ................................................. H06L 27/30
(52) U.S. Cl. ........................ 375/130; 375/132; 375/139; 375/140; 375/267; 455/134
(58) Field of Search ..................................... 375/130, 131, 375/132, 139, 140, 143, 150, 347, 349, 350, 267, 200–210, 430, 136, 138, 144, 148; 455/277.1, 277.2, 13.3, 272, 134

(56) References Cited

U.S. PATENT DOCUMENTS

| | | | |
|---|---|---|---|
| 4,726,073 | * | 2/1988 | Sessink ................................. 455/205 |
| 4,958,359 | | 9/1990 | Kato . |
| 4,977,615 | * | 12/1990 | Suzuki et al. ........................ 455/277 |
| 5,339,452 | * | 8/1994 | Sugawara ............................ 455/212 |
| 5,499,397 | * | 3/1996 | Wadin et al. ..................... 455/277.1 |
| 5,504,774 | * | 4/1996 | Takai et al. .......................... 375/204 |
| 5,528,581 | * | 6/1996 | De Bot ................................... 370/19 |
| 5,570,349 | * | 10/1996 | Bustamante et al. ................. 370/18 |
| 5,603,107 | * | 2/1997 | Gottfried et al. ..................... 455/133 |
| 5,608,410 | * | 3/1997 | Stilp et al. ............................ 342/387 |
| 5,630,213 | * | 5/1997 | Vannatta ............................... 455/133 |
| 5,657,026 | * | 8/1997 | Culpepper et al. ................... 342/374 |
| 5,668,829 | * | 9/1997 | Saito ..................................... 375/208 |
| 5,694,414 | * | 12/1997 | Smith et al. .......................... 375/200 |
| 5,694,417 | * | 12/1997 | Andren et al. ....................... 375/206 |
| 5,748,669 | * | 5/1998 | Yada ..................................... 375/202 |
| 5,748,676 | * | 5/1998 | Mahany ................................ 375/260 |
| 5,818,543 | * | 10/1998 | Lee ....................................... 348/725 |
| 5,918,164 | * | 6/1999 | Takahashi et al. ................... 455/134 |
| 5,940,452 | * | 8/1999 | Rich ..................................... 375/347 |

FOREIGN PATENT DOCUMENTS

| | | |
|---|---|---|
| 7-177074 | 7/1995 | (JP) . |
| 6-216618 | 8/1995 | (JP) . |
| 7-240702 | 9/1995 | (JP) . |
| 7-307723 | 11/1995 | (JP) . |

\* cited by examiner

Primary Examiner—Stephen Chin
Assistant Examiner—Shuwang Liu
(74) Attorney, Agent, or Firm—Fitzpatrick, Cella, Harper & Scinto

(57) ABSTRACT

There is provided a spread spectrum communication apparatus comprising a reception means for receiving a wideband spread spectrum signal, a wave detection means for performing wave detection on a predetermined narrow-band signal within the reception signal received by the reception means, and a de-spread means for de-spreading the wideband spread spectrum signal received by the reception means. Therefore, a desired one of a plurality of antennas to be used in a spread spectrum communication can be quickly and accurately selected, and also transmission power of the spread spectrum signal can be quickly and accurately controlled to have a desired value, whereby reliability of the spread spectrum communication can be increased.

25 Claims, 7 Drawing Sheets

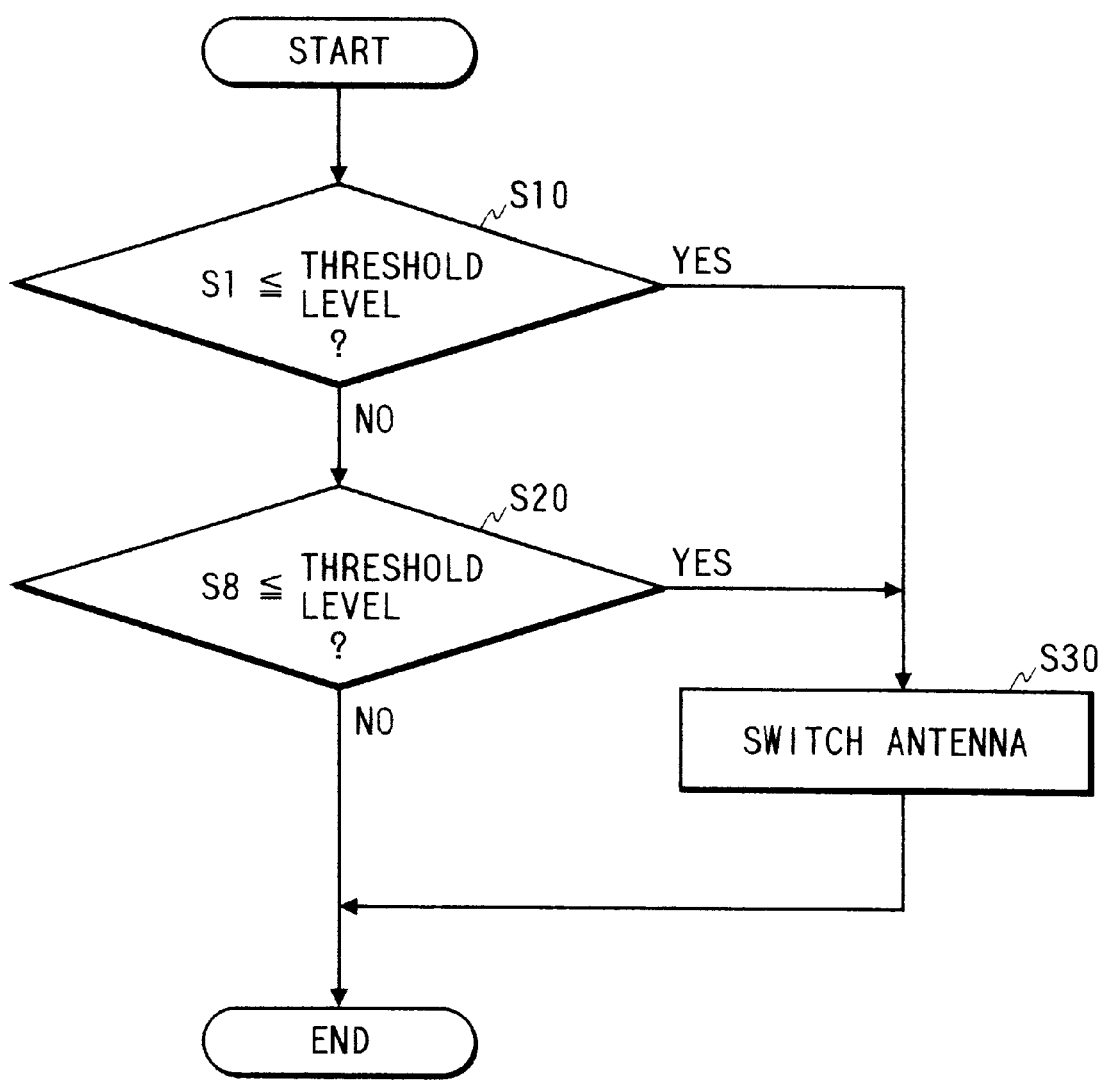

SPREAD SPECTRUM COMMUNICATION APPARATUS AND METHOD

BACKGROUND OF THE INVENTION

Field of the Invention

The present invention relates to spread spectrum communication apparatus and method for receiving a wide-band spread spectrum signal.

FIG. 2 shows a spread spectrum communication apparatus.

A received spread signal is supplied from one of antennas 111 and 112 which is selected by an antenna switch 110, to a low-noise amplifier 113 via a band-pass filter (BPF) 109. Then, a frequency of the received signal is converted into a predetermined frequency by a frequency converter 114 to which a local oscillator 102 is connected. The received signal which has been subjected to the frequency conversion is further subjected to predetermined band restriction by a band-pass filter (BPF) 115, and is then supplied to a variable amplifier 116. After then, the received signal of which level has been set at a predetermined reception level is supplied to a demodulator 117 to be demodulated to data S3, and the data S3 is subsequently supplied to a control unit 118.

In this case, an output from the variable amplifier 116 is also supplied to a wave detector 119 to detect field intensity of the received signal. A voltage detected by the wave detector 119 is applied to an automatic gain control (AGC) voltage generator 120, such that the applied voltage acts as a control voltage of the variable amplifier 116 to set the level of the received signal as a predetermined signal level. Also, an output from the AGC voltage generator 120 is supplied to an antenna switch signal generator 121 to switch or change the antenna in accordance with a signal S7 in a case where a level of such output is equal to or smaller than a predetermined threshold level.

However, in the spread spectrum communication apparatus shown in FIG. 2, since wave detection is performed by the wave detector 119 for an entire band (i.e., a band of the BPF 115) of the received signal, if there are noise components, e.g., an unnecessary wave included in the band, a cross modulation wave generated in a system, and the like, voltage levels of these noise components are also detected, whereby it is difficult to detect a normal signal level. Especially, as the level of the received signal becomes lower, an amplification factor of the variable amplifier 116 becomes larger, whereby only noise power is further amplified. Therefore, the level of the received signal can not be accurately detected. As a result, it is difficult to switch the antenna normally.

Further, since the received signal is a wide-band spread signal, a fall of spectrum within the band has various forms because of multipath. In this case, the multipath represents a phenomenon in which there are a plurality of paths, e.g., a reception side receives a direct wave and a reflected wave or receives a plurality of reflected waves.

FIGS. 3A to 3C respectively show states of the fall of spectrum of the received signal because of the multipath.

FIG. 3A shows the state that there is no fall of spectrum of the received signal because of the multipath, FIG. 3B shows the state that there is a fall of spectrum at a frequency adjacent to a central frequency f0 (i.e., apart from the central frequency f0 by f1), and FIG. 3C shows the state that there is the fall of spectrum at the central frequency f0. In the case of FIGS. 3B and 3C, in the apparatus shown in FIG. 2, if received power is uniform within the band, the wave detector 119 detects the same-level voltage.

However, error generation probability in the case of the fall of spectrum shown in FIG. 3B tends to be higher than that in case of the fall of spectrum shown in FIG. 3C. That is, as the fall of spectrum adjacent to a main lobe of the received signal is larger, the error generation probability tends to be higher.

Therefore, in the apparatus shown in FIG. 2, since the received signal is subjected to the wave detection for the entire band, differences of the fall of spectrum cannot be judged. Thus, there is a drawback that the antenna is switched only based on the field intensity of the received signal.

FIG. 7 shows the structure of a conventional spread spectrum communication apparatus which relates to transmission power control.

In FIG. 7, a code generator 7 generates a pseudo-noise (PN) code for use in de-spreading, and a multiplier 3 multiplies a received signal by an output of a local oscillator 10. An automatic gain control (AGC) voltage generator 19 outputs a control signal to a variable gain amplifier on a reception side. Also, the AGC voltage generator 19 outputs the control signal to a variable gain amplifier 13 on a transmission side.

In this manner, if a correlation output is used for transmission power control, there is a drawback that a long time is required.

Such drawback also occurs in a case where the correlation output is used for switching the antenna.

SUMMARY OF THE INVENTION

An object of the present invention is to improve spread spectrum communication.

Another object of the present invention is to increase reliability of the spread spectrum communication.

Another object of the present invention is to quickly and accurately select a desired antenna from among a plurality of antennas which are used for the spread spectrum communication.

Another object of the present invention is to quickly and accurately control transmission power of a spread spectrum signal, to a desired value.

The above and other objects of the present invention will become apparent from the following detailed description when read in conjunction with the accompanying drawings.

BRIEF DESCRIPTION OF THE DRAWINGS

FIG. 4 is a flow chart showing a first example of antenna switching control in accordance with the present invention;

DETAILED DESCRIPTION OF THE PREFERRED EMBODIMENTS

Figure 1:
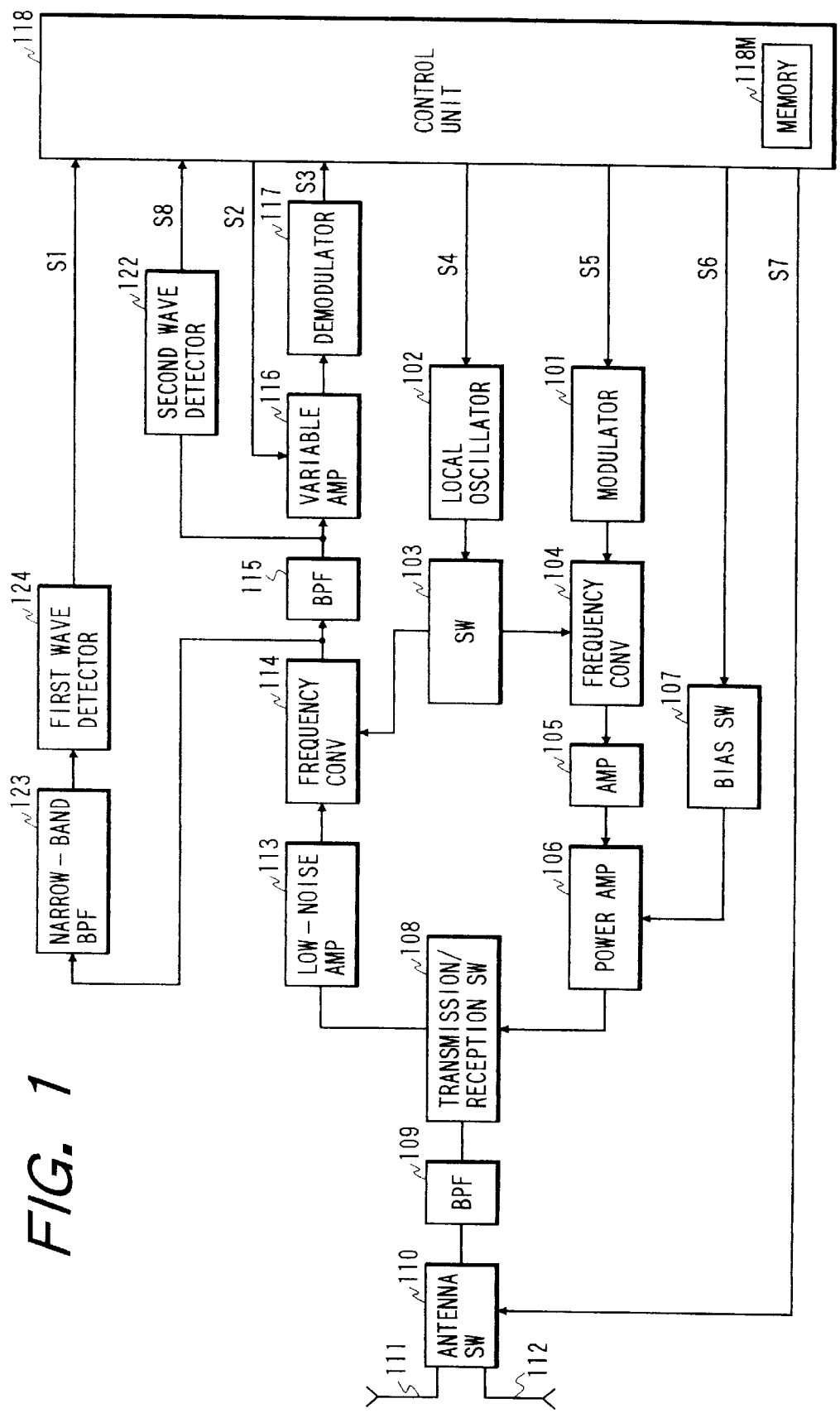
FIG. 1 is a block diagram showing the structure of first and third spread spectrum communication apparatuses to which the present invention is applied.

FIG. 1 is a block diagram showing a first spread spectrum communication apparatus to which the present invention is applied.

In the drawing, reference numeral 101 denotes a spread modulator which is composed of a local oscillator and a spread code generator (both not shown). The spread modulator 101 performs primary modulation on input data and then performs secondary modulation on the input data by using a spread code, to generate a spread signal having a predetermined band. Reference numeral 102 denotes a local oscillator, and reference numeral 103 denotes a switch. Supplying of an output from the local oscillator 102 is switched by the switch 103 from a transmission side to a reception side and vice versa at transmission and reception timings. Reference numeral 104 denotes a frequency converter which converts a frequency of the spread signal supplied from the spread modulator 101 into a desired frequency. The spread signal which has been subjected to the frequency conversion is amplified to have predetermined power via an amplifier 105 and a power amplifier 106, and is then supplied to a transmission/reception switch 108. Reference numeral 107 denotes a bias switch which operates to change an operation point of the power amplifier 106 in response to a bias switch signal S6.

Reference numeral 108 denotes the transmission/reception switch which performs switching between a transmission signal and a reception signal at the transmission and reception timings. In the case of transmission, the spread signal is supplied to a band-pass filter (BPF) 109 via the transmission/reception switch 108. The output signal from the BPF 109 is then supplied to the antenna switch 110 as the spread signal which has been subjected to desired band restriction, and is thereafter radiated in the air via either one of antennas 111 and 112. On the other hand, in the case of reception, the received spread signal is supplied from one of the antennas 111 and 112 selected by the antenna switch 110, to a low-noise amplifier 113 via the BPF 109 and the transmission/reception switch 108. Subsequently, the frequency of the supplied spread signal is converted into a predetermined frequency by a frequency converter 114.

The received signal of which the frequency has been converted into the predetermined frequency by the frequency converter 114 is distributed to a band-pass filter (BPF) 115 and a narrow-band band-pass filter (BPF) 123. The signal which has been subjected to the predetermined band restriction is supplied to a variable amplifier 116 and a second wave detector 122. Then, a level of the signal which has passed through the variable amplifier 116 is set as a constant signal level, and such signal is supplied to a demodulator 117. Subsequently, data S3 which is output from the demodulator 117 is subjected to de-spreading demodulation in accordance with the spread code, and then the demodulated signal is supplied to a control unit 118.

Further, field intensity of the received signal within the band of the BPF 115 is detected in response to the signal supplied to the second wave detector 122. On the other hand, the signal of which the band has been restricted by the narrow-band BPF 123 to a frequency adjacent to a central frequency is supplied to a first wave detector 124, and the field intensity of the signal is detected by the first wave detector 124. In this case, the second wave detector 122 detects the intensity of the received signal having the wide reception band which signal has been subjected to spectrum spreading. Further, the first wave detector 124 detects intensity of the received signal having the band which has been restricted to be sufficiently narrower than the above-described wide reception band (i.e., such narrow band being adjacent to the central frequency of the reception band).

By using a signal S1 supplied from the first wave detector 124 and a signal S8 supplied from the second wave detector 122, the control unit 118 performs the switching between the antennas 111 and 112 in accordance with a flow chart shown in FIG. 4. That is, in a case where the signal S1 becomes equal to or lower than a first threshold level (step S10) or in a case where the signal S2 becomes equal to or lower than a second threshold level (step S20), the control unit 118 performs the switching of the antenna (step S30). Further, in order to set the level of the received signal as the constant signal level, the control unit 118 also uses the signal S8 detected by the second wave detector 122 as a control signal S2 for the variable amplifier 116. A control program of the control unit 118 which program is represented by the flow chart shown in FIG. 4 is stored in a memory 118M. Such control program may be previously stored in the memory 118M, or may be read from a disk memory (not shown) into the memory 118M in response to power on. Further, such the control program stored in the memory 118M may be rewritten in response to the received signal supplied from the antenna 111 or 112.

Figure 5:
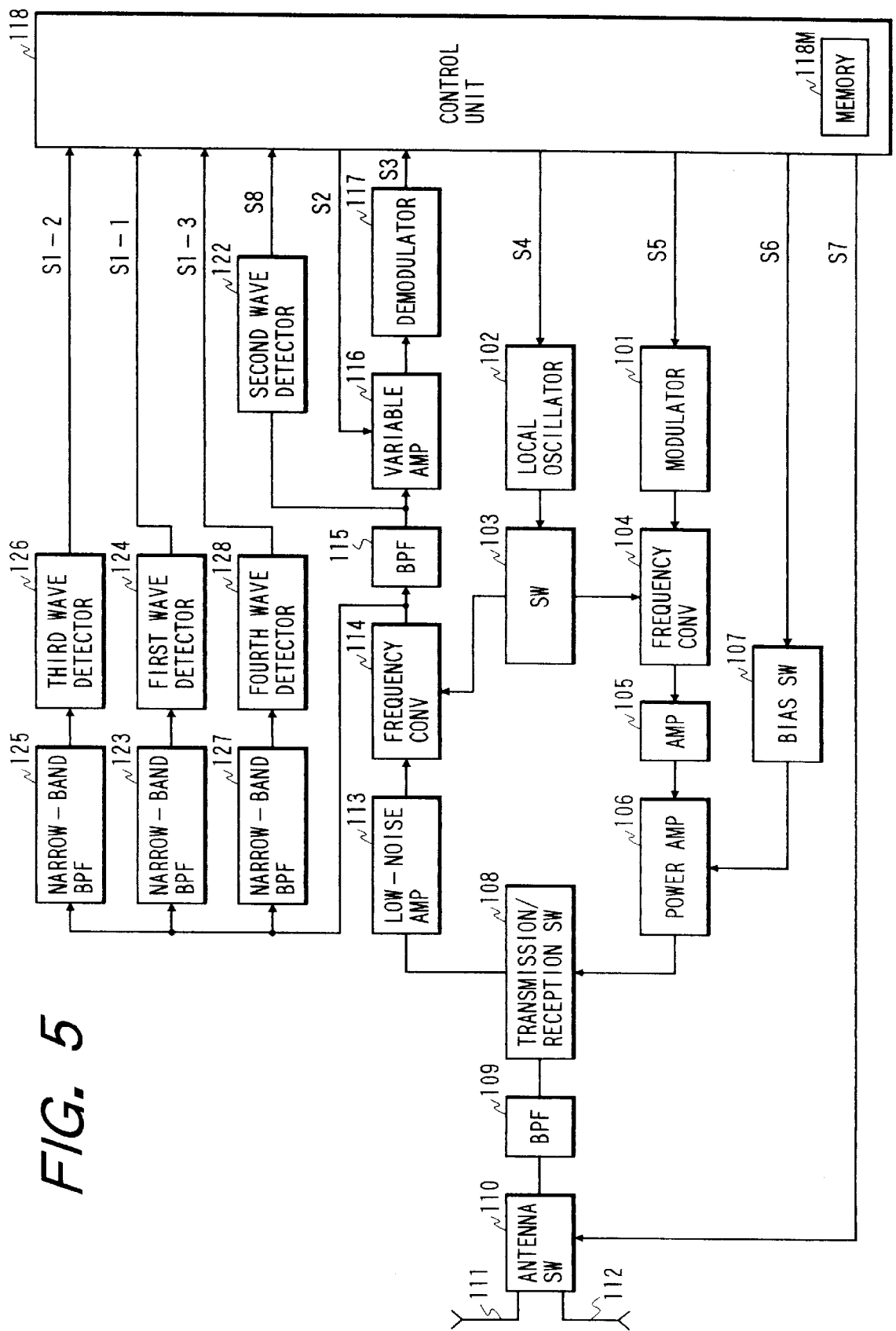
FIG. 5 is a block diagram showing the structure of second and fourth spread spectrum communication apparatuses to which the present invention is applied.

FIG. 5 is a block diagram showing a second spread spectrum communication apparatus to which the present invention is applied.

Figure 2:
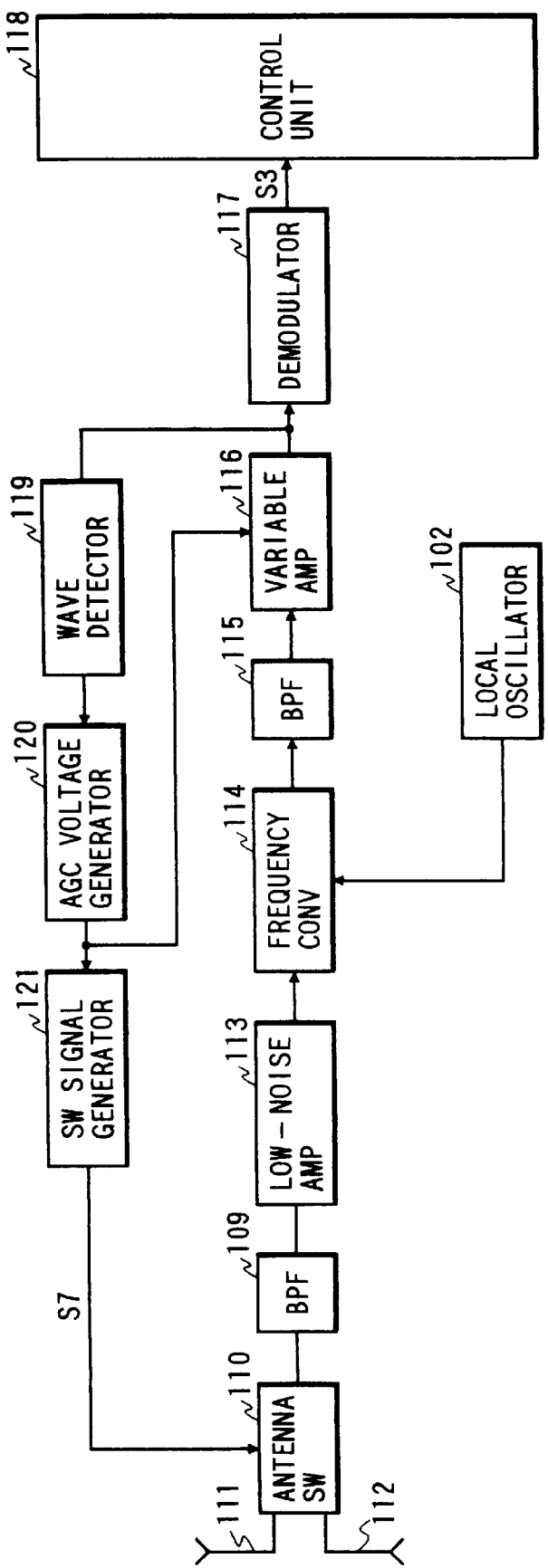
FIG. 2 is a block diagram showing the structure of a spread spectrum communication apparatus.
Figure 3A:
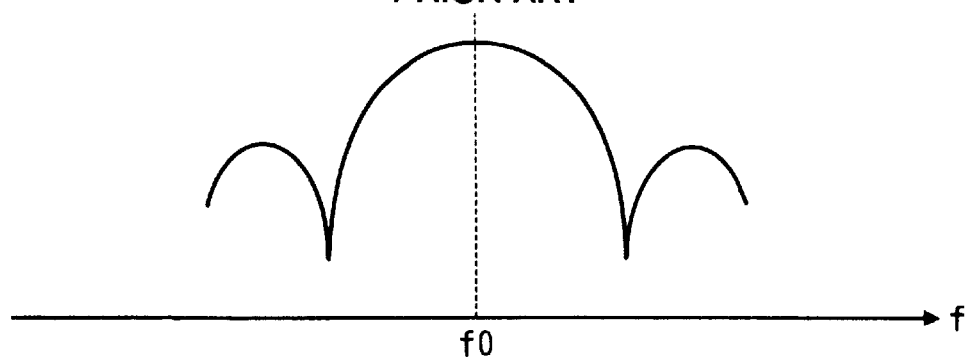
FIGS. 3A to 3C show states of a fall of spectrum of a received signal because of a multipath error in spread spectrum communication.
Figure 3B:
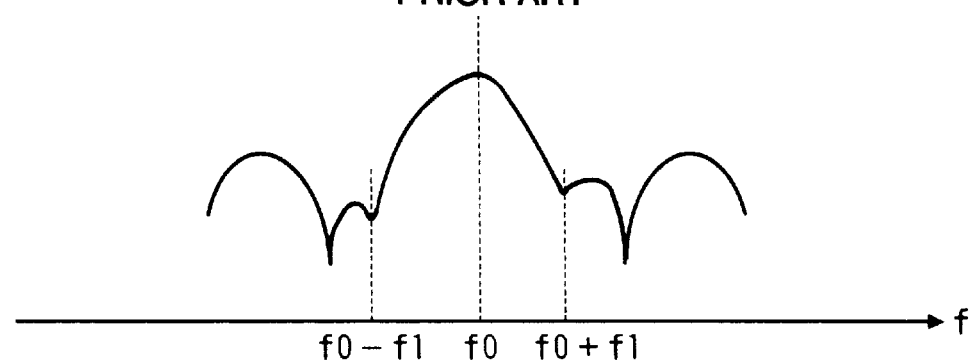
Figure 3C:
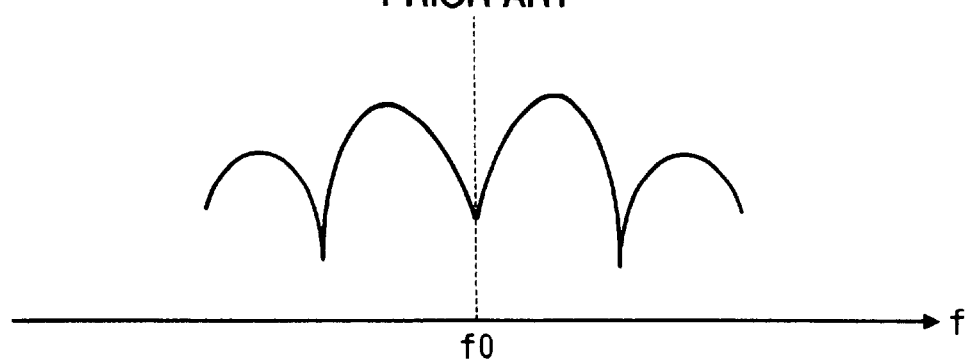

In FIG. 5, the same components as those in FIGS. 1 and 2 are added with the same reference numerals, and thus the explanation thereof is omitted.

A received signal of which frequency has been converted into a predetermined frequency by a frequency converter 114 is distributed to a band-pass filter (BPF) 115, a first narrow-band BPF 123, a second narrow-band BPF 125 and a third narrow-band BPF 127, respectively. The signal which has been subjected to predetermined band restriction by the BPF 115 is supplied to a variable amplifier 116 and a second wave detector 122. Then, a level of the signal which has passed through the variable amplifier 116 is set as a constant reception level, and such signal is supplied to a demodulator 117. Subsequently, a signal S3 output from the demodulator 117 is subjected to despread demodulation and then supplied to a control unit 118.

Further, field intensity of the received wide-band signal is detected on the basis of the signal supplied to the second wave detector 122. On the other hand, reception field intensity of each signal which has been subjected to the band restriction by each of the first to third narrow-band BPFs 123, 125 and 127 to have the band narrower than a reception frequency band is detected by each of first, third and fourth wave detectors 124, 126 and 128. These three narrow-band BPFs 123, 125 and 127 are allocated to respective frequency bands which are sufficiently apart from others, such that each band of these BPFs does not overlap with others within the reception frequency band. In this case, it is assumed that, within the reception frequency band, the narrow-band BPF 123 is set to be adjacent to a central frequency, the narrow-band BPF 125 is set to be adjacent to a lower-limit frequency, and the narrow-band BPF 127 is set to be adjacent to an upper-limit frequency.

Figure 6:
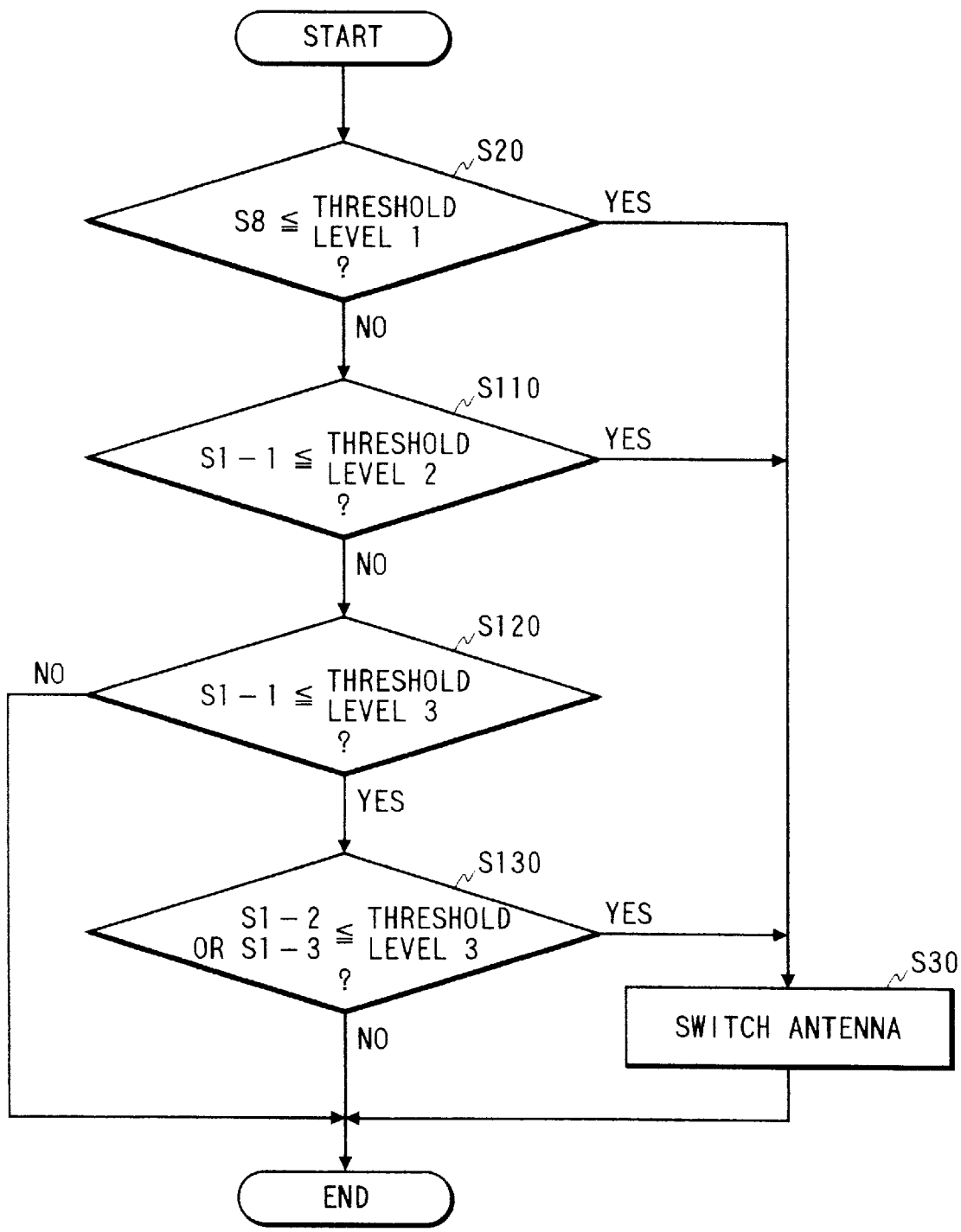
FIG. 6 is a flow chart showing a second example of antenna switching control in accordance with the present invention.
Figure 7:
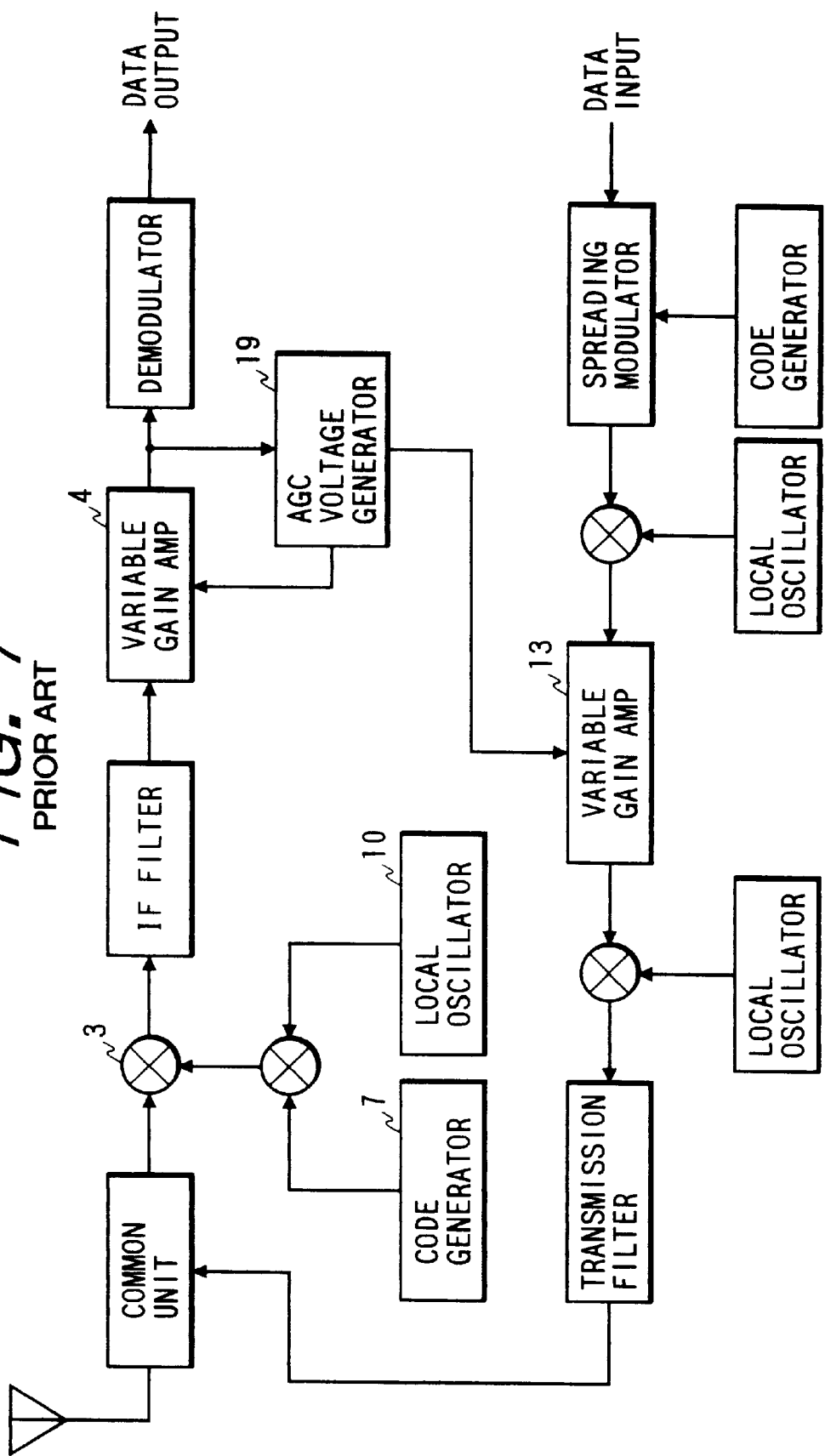
FIG. 7 is a block diagram showing the structure of a conventional spread spectrum communication apparatus.

In accordance with a flow chart shown in FIG. 6, the control unit 118 performs switching between antennas 111 and 112 in response to signals S1-1 to S1-3 respectively supplied from the first, third and fourth wave detectors 124, 126 and 128, and a signal S8 supplied from the second wave detector 122. In a case where the signal S8 is equal to or lower than a threshold level 1 (step S20), in a case where the signal S1-1 is equal to or lower than a threshold level 2 (step S110), or in a case where one of the signals S1-2 and S1-3 and the signal S1-1 are equal to or lower than a threshold level 3 (steps S120 and S130), the control unit 118 performs the switching of the antenna (step 530). In the flow chart shown in FIG. 6, the threshold level 1 corresponds to the signal S8, the threshold level 2 corresponds to the signal S1-1 and the threshold level 3 corresponds to the signals S1-1 to S1-3, respectively. Further, the threshold levels 2 and 3 satisfy relationship that the threshold level 2< the threshold level 3.

Furthermore, the control unit 118 also uses the signal S8 which has been detected by the second wave detector 122, as a control signal S2 of the variable amplifier 116, to set a reception signal level as a constant signal level. A control program of the control unit 118 which program is represented by the flow chart shown in FIG. 6 is stored in a memory 118M. Such control program may be previously stored in the memory 118M, or may be read from a disk memory (not shown) into the memory 118M in response to power on. Further, such control program stored in the memory 118M may be rewritten in response to the received signal supplied from the antenna 111 or 112.

Furthermore, in order to simplify the control, the process represented by the step S20 may be omitted in the procedures shown in FIGS. 4 and 6. That is, the signal S8 need not be used for switching the antenna.

In the above structure shown in FIGS. 1 and 5, the number of the antennas to be switched is two. However, the present invention is not limited to such structure. That is, even if the number of the antennas to be switched is three or more, the same effect as described above can be derived in the present invention.

Further, in the structure shown in FIG. 5, the number of the narrow-band BPFs is three. However, the present invention is not limited to such structure. That is, by observing only the specific frequency band using the two or more narrow-band BPFs, a propagation state within the reception band can be grasped. Therefore, more fine or smooth control becomes possible by increasing the number of the narrow-band BPFs.

Furthermore, in the structure shown in FIG. 5, the output threshold levels of the narrow-band BPF are two levels. However, the present invention is not limited to such structure. That is, by providing multiple threshold levels in accordance with the number of the narrow-band BPFs to be used, more fine or smooth control becomes possible.

In the above structure shown in FIGS. 1 and 5, the antenna switching control is performed in accordance with the level of the signal which has passed through the narrow-band BPF. In the third and fourth spread spectrum communication apparatuses to which the present invention is applied, the control unit 118 generates the signal S6 and performs the transmission power control in the bi-directional (two-way) communication in response to the signal S1 or the signals S1-2 to S1-3.

Further, in the third and fourth spread spectrum communication apparatuses, the control unit 118 controls the bias switch 107 in response to the detection output signals S1, S1-1, S1-2 and S1-3. However, the antenna switch 110 may be controlled or may not be controlled.

Furthermore, in the third and fourth spread spectrum communication apparatuses, the control programs of the control unit 118 are stored in the memory 118M in the same manner as those of the control unit 118 in the first and second spread spectrum communication apparatuses.

Furthermore, in the case where the present invention is applied to the antenna switching, the present invention can be applied to an apparatus which is exclusively used for the reception and thus does not have any structure for the transmission.

Furthermore, in the first to third spread spectrum communication apparatuses, the control unit 118 detects magnitude of the reception signal supplied from the antenna which has been selected by the antenna switch 110. However, by providing two pairs of the narrow-band BPF 123 and the first wave detector 124 or two pairs of the narrow-band BPFs 123, 125 and 127 and the wave detectors 124, 126 and 128 for each antenna, the antenna switching or the transmission power switching may be controlled in accordance with magnitude of the reception signals of the respective antennas.

Although the present invention has been described above with respect to the preferred embodiments, the present invention is not limited to the foregoing embodiments but many modifications and variations are possible with the spirit and scope of the appended claims.

What is claimed is:

1. A spread spectrum communication apparatus comprising:

a plurality of reception means for receiving a wide-band signal;

de-spread means for de-spreading the wide-band signal;

detection means for detecting a narrow-band signal within the wide-band signal which is not de-spread by said de-spread means; and selection means for selecting a second one of said plurality of reception means in a case where the narrow-band signal received by a first one of said plurality of reception means and detected by said detection means is lower than a predetermined level.

2. An apparatus according to claim 1, wherein said detection means comprises band-pass filter means which has a band width sufficiently narrower than a band width of the wide-band signal.

3. An apparatus according to claim 1, wherein said detection means comprises a plurality of band-pass filter means which have band widths sufficiently narrower than a band width of the wide-band signal.

4. An apparatus according to claim 3, wherein said plurality of band-pass filter means respectively have band widths different from each other.

5. An apparatus according to claim 1, wherein said plurality of reception means comprises a plurality of antennas.

6. An apparatus according to claim 5, wherein said detection means detects first and second narrow-band signals within the wide-band signal, the first narrow-band signal corresponding to a central frequency of the wide-band signal, and the second narrow-band signal corresponding to upper or lower limit of the wide-band signal, and in a case where the first and second narrow-band signals received by one of said plurality of antennas are respectively smaller than first and second threshold values, said selection means selects another one of said plurality of antennas, the first threshold value being smaller than the second threshold value.

7. An apparatus according to claim 1, further comprising:
transmission means; and
control means for controlling transmission power of said transmission means in accordance with the narrow-band signal detected by said detection means.

8. An apparatus according to claim 1, wherein said de-spread means de-spreads the wide-band signal, in accordance with a spreading code.

9. A spread spectrum communication method comprising the steps of:
receiving a wide-band signal via a plurality of antennas;
de-spreading the wide-band signal;
detecting a narrow-band signal within the wide-band signal which is not de-spread in said de-spreading step; and
selecting a second one of the plurality of antennas in a case where the narrow-band signal received via a first one of the plurality of antennas and detected in said detecting step is lower than a predetermined level.

10. A method according to claim 9, further comprising a step of controlling transmission power.

11. A method according to claim 9, wherein a plurality of narrow-band signals are detected in said detecting step, and the second one of the plurality of antennas is selected in accordance with the plurality of narrow-band signals in said controlling step.

12. A method according to claim 9, wherein the narrow-band signal is corresponding to a central frequency of the wide-band signal.

13. An apparatus according to claim 1, wherein the narrow band signal is corresponding to a central frequency of the wide-band signal.

14. A spread spectrum communication apparatus comprising:
reception means for receiving a wide-band signal;
de-spread means for de-spreading the wide-band signal;
detecting means for detecting a plurality of narrow-band signals within the wide-band signal which is not de-spread by said de-spreading means; and
control means for controlling spread spectrum communication using the wide-band signal in accordance with each of the plurality of narrow-band signals detected by said detecting means.

15. An apparatus according to claim 14, wherein said detection means comprises a plurality of band-pass filter means which have band widths sufficiently narrower than a band width of the wide-band signal.

16. An apparatus according to claim 15, wherein said plurality of band-pass filter means respectively have band widths different from each other.

17. An apparatus according to claim 14, wherein said reception means comprises a plurality of antennas, and said control means selects one of the plurality of antennas in accordance with the plurality of narrow-band signals detected by said detection means.

18. An apparatus according to claim 17, wherein said detection means detects first and second narrow-band signals within the wide-band signal the first narrow-band signal corresponding to a central frequency of the wide-band signal and the second narrow-band signal corresponding to upper or lower limit of the wide-band signal, and
in a case where the first and second narrow-band signals received by one of said plurality of antennas are respectively smaller than first and second threshold values, said selection means selects another one of said plurality of antennas, the first threshold value being smaller than the second threshold value.

19. An apparatus according to claim 14, further comprising transmission means,
wherein said control means controls transmission power of said transmission means in accordance with the plurality of narrow-band signals detected by said wave detection means.

20. An apparatus according to claim 14, wherein said de-spread means de-spreads the wide-band signal in accordance with a spreading code.

21. An apparatus according to claim 14, wherein one of the plurality of narrow-band signals is corresponding to a control frequency of the wide-band signal.

22. A spread spectrum communication method comprising the steps of:
receiving a wide-band signal;
de-spreading the wide-band signal;
detecting a plurality of narrow-band signals within the wide-band signal which is not de-spread in said de-spreading step; and
controlling spread spectrum communication using the wide-band signal in accordance with each of the plurality of narrow-band signals detected in said detecting step.

23. A method according to claim 22, wherein one of a plurality of antennas is selected in said controlling step.

24. A method according to claim 22, wherein transmission power is controlled in said controlling step.

25. A method according to claim 22, wherein one of the plurality of narrow-band signals is corresponding to a central frequency of the wide-band signal.

* * * * *

UNITED STATES PATENT AND TRADEMARK OFFICE
CERTIFICATE OF CORRECTION

PATENT NO.    : 6,289,036 B1
DATED         : September 11, 2001
INVENTOR(S)   : Katsuo Saito et al.

It is certified that error appears in the above-identified patent and that said Letters Patent is hereby corrected as shown below:

Column 2,
Line 57, "flow chart" should read -- flowchart --; and
Line 62, "flow chart" should read -- flowchart --.

Column 4,
Line 8, "flow chart" should read -- flowchart --;
Line 18, "flow" should read -- flow- --;
Line 22, "the" (second occurrence) should be deleted; and
Line 63, "flow chart" should read -- flowchart --.

Column 5,
Line 7, "(step 530)." should read -- (step S30). --; and "flow chart" should read -- flowchart --.
Line 12, "satisfy" should read -- satisfy the --; and
Line 19, "flow chart" should read -- flowchart --.

Column 6,
Line 24, "with" should read -- within --;
Line 53, close up right margin; and
Line 59, "to" should read -- to an --.

Column 7,
Line 7, "signal," should read -- signal --;
Line 29, "is corresponding" should read -- corresponds --; and
Line 32, "narrow band" should read -- narrow-band --; and "is corresponding" should read -- corresponds --.

UNITED STATES PATENT AND TRADEMARK OFFICE
CERTIFICATE OF CORRECTION

PATENT NO. : 6,289,036 B1
DATED : September 11, 2001
INVENTOR(S) : Katsuo Saito et al.

It is certified that error appears in the above-identified patent and that said Letters Patent is hereby corrected as shown below:

Column 8,
Line 8, "signal" (first occurrence) should read -- signal, --;
Line 10, "to" should read -- to an --;
Line 23, "wave" should be deleted;
Line 24, "detection" should read -- detecting --;
Line 29, "is corresponding" should read -- corresponds --; and
Line 49, "is corresponding" should read -- corresponds --.

Signed and Sealed this

Twenty-third Day of July, 2002

Attest:

JAMES E. ROGAN
*Attesting Officer*     *Director of the United States Patent and Trademark Office*